Aug. 18, 1931.   R. K. BONELL   1,819,069
STATIC FREQUENCY CHANGER
Filed Oct. 2, 1928

INVENTOR
R. K. Bonell
BY
ATTORNEY

Patented Aug. 18, 1931

1,819,069

UNITED STATES PATENT OFFICE

RALPH K. BONELL, OF EAST ORANGE, NEW JERSEY, ASSIGNOR TO AMERICAN TELEPHONE AND TELEGRAPH COMPANY, A CORPORATION OF NEW YORK

STATIC FREQUENCY CHANGER

Application filed October 2, 1928. Serial No. 309,790.

This invention relates to static frequency changers, that is, to means for obtaining current of one frequency from a source of current supply of a different frequency without the use of movable elements. More particularly the invention relates to a frequency reducer of the static type whereby current of one frequency may be obtained from a source of current of a higher frequency.

The specific purpose for which it is proposed to utilize such means is to obtain a source of 20-cycle current to be used in ringing on telephone circuits from the usual source of 60-cycle power supplied by the power and lighting companies.

Figure 1:
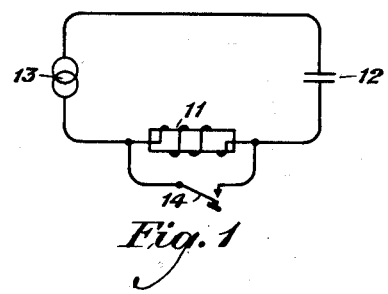

The invention will be explained in connection with the drawings, of which Figure 1 discloses a simplified schematic circuit which is used in explaining the theory of operation of the frequency reducer, while Fig. 2 discloses the specific embodiment which it is proposed to use for obtaining the 20-cycle ringing current from the 60-cycle power supply.

The principle of operation underlying the specific embodiment of the present invention has been disclosed by the prior art. An attempt will be made herein, however, to explain how the circuit operates. Referring to Fig. 1, assume a choke coil 11 having a core of magnetic material and a condenser 12 connected in a circuit as shown and tuned to a certain fundamental frequency. Assume a source of alternating current supply 13 active in such circuit, which supply has a frequency equal to a harmonic of the fundamental frequency to which the circuit is tuned. If the source of supply 13 is adjusted to a value sufficient to saturate or slightly over-saturate the magnetic core of choke coil 11, the circuit will normally oscillate at the frequency of the impressed voltage and the harmonics thereof. If, however, under the conditions described the circuit is subjected to an electrical shock as by closing and opening switch 14, shunting the choke coil, transient oscillations will be set up in the circuit at the fundamental frequency and at other frequencies dependent upon the magnitude of saturation at the choke coil 11. With the source of voltage 13 of a frequency equal to a harmonic of the fundamental, active in the circuit, however, the transient oscillations will not die out exponentially in the usual manner but such oscillations will be sustained by continuing thereafter to draw energy from the source of power 13.

It is a well known fact in the electrical alternating current theory that, where a voltage of given frequency is active in a circuit containing a plurality of frequencies including that of the applied voltage, effective power supplied to such circuit is proportional to the product of the applied voltage and the in-phase component of current of the same frequency as the applied voltage. Owing to this fact, it is rather difficult to understand how in the present instance the voltage of a harmonic frequency can supply power to sustain oscillations of frequency different from itself. The probable explanation is this: The resultant flux set up in the choke coil 11 adjusts the phase relation between the applied voltage and the harmonic current of the same frequency to such a value that the source of power 13 is enabled to supply through such harmonic frequency the total losses due to all the modes of oscillation in the circuit.

Having once started oscillation at the fundamental frequency in the manner described, power of such frequency may be obtained from the oscillating circuit by means of a suitable transformer and filter arrangement associated therewith.

Figure 2:
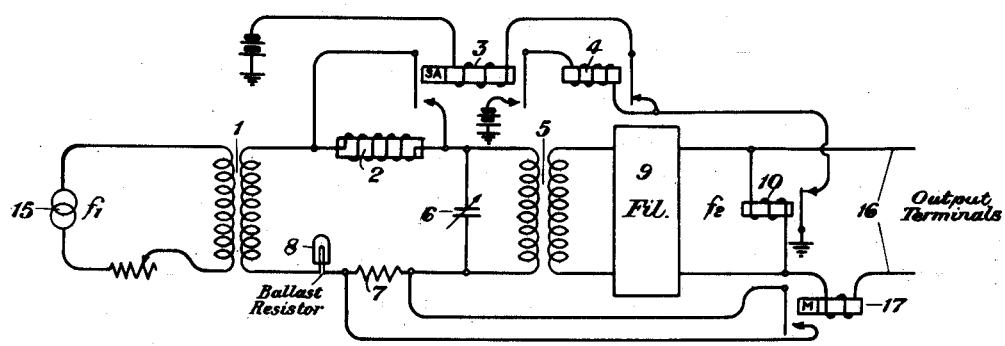

Referring now to Fig. 2, which discloses the specific embodiment in which it is proposed to utilize the frequency reducer, a source of power supply of frequency $f_1$ is indicated at 15. This source of supply is inductively coupled with the oscillating circuit by means of transformer 1. The desired lower frequency current $f_2$ is taken off from the oscillating circuit by means of transformer 5, an approximately pure sine wave being obtained by passing the output current through filter 9, which is adapted to pass the current of frequency $f_2$ but to filter out other frequencies. The choke coil of the oscillating circuit is shown at 2. Since, however, in the arrangement shown, transformers 1 and 5 affect the frequency of oscillation, the condenser 6 must be so adjusted that operating in conjunction with the inductance of coils 1, 2, and 5 the circuit as a whole will oscillate at the desired fundamental frequency $f_2$.

In order to explain the improvements embodied in the present disclosure over the prior art, it is necessary at this point to bring out the fact that the frequency reducer circuit of the type disclosed herein is rather unstable in operation in that the circuit will not oscillate unless certain definite relations exist among the circuit constants, namely, the applied voltage, inductance, resistance, and capacity. That is, there is a "zone of existence", so to speak, for the condition of oscillation which is dependent upon the circuit parameters. If the circuit is oscillating satisfactorily, a change of considerable magnitude in any of these factors may cause the circuit to cease oscillating. A change in one such factor, however, which would cause the circuit to cease oscillating, may be offset by a compensating change in another factor.

Another peculiarity of the circuit to be noted is its tendency to break over from one frequency of oscillation to a different frequency due to certain changes in the circuit parameters. If, for example, the circuit is oscillating satisfactorily at the fundamental frequency, any change of the circuit constants which causes a large increase of current in the oscillating circuit, such as an increase in magnitude of the applied voltage or reduction of the total resistance in the oscillatory circuit might cause the circuit to cease operating at the fundamental frequency and to oscillate violently at the frequency of the applied voltage. This is brought about by the fact that the large current value by over-saturating coil 2, reduces its effective inductance and thus increases the fundamental frequency of oscillation to coincide with that of the applied voltage.

Owing to the points brought out immediately above, certain circuit requirements must be observed to obtain satisfactory operation of the circuit. For example, the oscillating circuit is required to have a fairly low total resistance in order to permit large free oscillations. Since a large part of the resistance is in choke coil 2, this coil should have a high ratio of reactance to resistance. Furthermore, coil 2 must not be saturated to too great an extent by the power requirements, otherwise it will cause the circuit to break over into a higher frequency of oscillation, as described above. Coil No. 2, in order to furnish an appreciable power output therefore, should have a large core of magnetic material or a core of high permeability or both. A further requirement of coil 2 is that the core should be of such a material that its permeability decreases rapidly at the saturation point in order to supply free oscillations rich in harmonics. In general, a coil having an iron core, therefore, is not as satisfactory from this standpoint, as one having a core of some other magnetic material. It is suggested that the recently developed permalloy would be satisfactory for this purpose. In the embodiment of Fig. 2, coil 2 is assumed to have the desired characteristics pointed out above although no specific design specifications are included herein.

It is desirable that the current in the oscillating circuit should not be affected by variations in the load current to any marked extent, otherwise, the difficulties pointed out above of maintaining suitable circuit operation, would be encountered. It is suggested that a ballast resistor, such as a ballast lamp 8, be inserted in the oscillating circuit as shown in order to maintain the current in such circuit approximately constant.

Another method of equalizing the current in the oscillating circuit under increasing load, is shown by the circuit comprising resistance 7 and relay 17. An increase in the output current supplied through terminals 16 increases the effective resistance in the oscillating circuit, and hence the amplitude of the fundamental oscillation tends to decrease in such circuit as the load output increases. Since a change of this sort tends to cause the circuit to cease oscillating at the fundamental frequency, it is desirable to maintain the effective resistance of the circuit approximately constant. This is accomplished by means of the circuit indicated above, as follows: Relay 17 is a marginal relay which does not operate at small loads. Under such circumstances, resistance 7 is connected in the oscillating circuit. As the load current increases beyond a certain specified value, relay 17 operates and thus shunts out resistance 7, in this way reducing the resistance in the oscillating circuit to compensate for the increase in effective resistance due to the increased load current.

In spite of the precautions taken to maintain the circuit oscillating at the fundamental frequency, there is always the possibility that some abrupt circuit change will cause the cessation of the free oscillations. It is desirable, therefore, that the circuit be equipped with some automatic means for starting the oscillations again as soon as they are stopped in such fashion. Such an automatic circuit is disclosed by the arrangement comprising relays 3, 4, and 10. The circuit operates in the following manner. With the oscillating circuit functioning in a normal manner and supplying current to the output terminals 16, part of the output current will flow through relay 10, holding it operated. If, however, for any reason the output current fails, relay 10 will immediately release and close a circuit to operate relay 3. The circuit is traced from grounded battery through the winding of relay 3, back contact of relay 4 and back contact of relay 10 to ground. Relay 3 operates over this circuit and connects a short-circuit through its left front contact across the winding of choke coil 2. The operation of relay 3, furthermore, closes a circuit to operate relay 4, said circuit being traced from grounded battery through the right front contact of relay 3, winding of relay 4 to ground through the back contact of relay 10. The operation of relay 4 opens at its armature contact, the operating circuit of relay 3, thus causing relay 3 to release and remove the short-circuit from the winding of coil 2, in turn causing the free oscillations to be set up in the oscillating circuit in the manner described above. Normally, the free oscillations thus started will be sustained thereafter in the manner explained above by the source of harmonic power $f_1$ causing current of frequency $f_2$ to build up in the output circuit and reoperate relay 10. Before relay 10 has had time to reoperate, however, the release of relay 3 by opening the operating circuit of relay 4, will have caused the release of the latter relay, thus completing again the operating circuit of relay 3 to ground through the back contact of relay 10, tending to cause a repetition of the cycle of operations described. To prevent this, relay 3 is made sufficiently slow acting that the time required for its reoperation is greater than that required for current to build up in the output circuit and reoperate relay 10, to remove the ground and prevent the reoperation of relay 3. Of course, if the release of relay 3 does not start up sustained oscillations in the output circuit, relay 10 will remain inoperative and the cycle of operations will be repeated over and over again until sustained oscillations do occur.

What is claimed is:

1. Static frequency reducing means comprising in combination a circuit adapted to oscillate freely at a fundamental frequency and at the harmonics thereof, said circuit containing suitable capacity and inductive means having a core of magnetic material, means for starting the free oscillations in said circuit, a source of current of one said harmonic frequency coupled therewith for sustaining said free oscillations thereafter by saturating said magnetic core, an output circuit coupled with said circuit for utilizing current of desired frequencies, relay means controlled by the output current for automatically reoperating said starting means upon failure of the output current, and a ballast resistor in said oscillatory circuit for equalizing the current therein.

2. Static frequency reducing means comprising in combination a circuit adapted to oscillate freely at a fundamental frequency and at the harmonics thereof, said circuit containing a suitable capacity and inductive means having a core of magnetic material, means for starting the free oscillations in said circuit, a source of current of one said harmonic frequency coupled therewith for sustaining said free oscillations by saturating said magnetic core, an output circuit coupled with said circuit for utilizing current of desired frequencies, relay means controlled by the output current for automatically reoperating said starting means upon failure of the output current, and a resistance inserted in said oscillatory circuit, means for short circuiting said resistance for output currents exceeding a specified magnitude.

3. Static frequency reducing means comprising in combination a circuit adapted to oscillate freely at a fundamental frequency and at the harmonics thereof, said circuit containing suitable capacity and inductive means having a core of magnetic material, means for starting the free oscillations in said circuit, a source of current of one said harmonic frequency coupled therewith for sustaining said free oscillations by saturating said magnetic core, an output circuit coupled with said circuit for utilizing current of desired frequencies, relay means controlled by the output current for automatically reoperating said starting means upon failure of the output current, a ballast resistor in said oscillatory circuit, an additional fixed resistance therein, and relay means associated with said output circuit for short circuiting said additional resistance for output currents exceeding a specified magnitude.

4. Static frequency reducing means comprising in combination a circuit including inductance and capacity and adapted to oscillate freely at a fundamental frequency and at the harmonics thereof, means for starting the free oscillations therein, a source of current of one said harmonic frequency coupled with said circuit for sustaining said free oscillations thereafter, an output circuit for utilizing current of desired frequencies, relay means associated with said output circuit and adapted to be de-energized by the failure of the output current, and means controlled by said relay means and operative during the time said relay means is de-energized for automatically and alternately operating and re-operating said starting means.

5. Static frequency reducing means comprising in combination a circuit including inductance and capacity and adapted to oscillate freely at a fundamental frequency and at the harmonics thereof, means for starting the free oscillations therein, a source of current of one said harmonic frequency coupled with said circuit for sustaining said free oscillations thereafter, an output circuit for utilizing current of desired frequencies, relay means associated with said output circuit and adapted to be released by the failure of the output current, and means controlled by the release of said relay means for automatically rendering said inductance alternately ineffective and effective in said circuit as long as said relay means remains released.

6. Static frequency reducing means comprising in combination a circuit including inductance and capacity and adapted to oscillate freely at a fundamental frequency and at the harmonics thereof, means for starting the free oscillations therein, a source of current of one said harmonic frequency coupled with said circuit for sustaining said free oscillations thereafter, an output circuit for utilizing the current of desired frequencies, relay means associated with said output circuit and adapted to be released by the failure of the output current, and means controlled by said relay means and operative during the time said relay means remains released for automatically rendering said inductance ineffective in said circuit after the lapse of a predetermined interval from the time said relay means releases and for automatically rendering said inductance effective in said circuit immediately thereafter.

7. Static frequency reducing means comprising in combination a circuit including inductance and capacity and adapted to oscillate freely at a fundamental frequency and at the harmonics thereof, means for starting the free oscillations therein, a source of current of one said harmonic frequency coupled with said circuit for sustaining said free oscillations thereafter, an output circuit for utilizing current of desired frequencies, a first relay associated with said output circuit and adapted to be released by the failure of the output current, a slow acting relay controlled by said first relay for rendering said inductance ineffective in said circuit when said slow acting relay is operated and for rendering said inductance effective in said circuit when said slow acting relay is released, and means controlled by said slow acting relay for alternately opening and closing the circuit of said slow acting relay as long as said first relay remains released.

8. Static frequency reducing means comprising in combination a circuit adapted to oscillate freely at a fundamental frequency and at the harmonics thereof, means for starting the free oscillation therein, a source of current of one said harmonic frequency associated with said circuit for sustaining said free oscillations thereafter, an output circuit for utilizing current of desired frequencies, a resistance connected in said oscillatory circuit, and means associated with said output circuit for short-circuiting said resistance for output currents exceeding a predetermined magnitude.

9. An oscillatory system comprising in combination a circuit adapted to oscillate freely at a fundamental frequency and at the harmonics thereof, means for starting the free oscillations therein, a source of current of one said harmonic frequency associated with said circuit for sustaining the free oscillations thereafter, an output circuit for utilizing current of desired frequencies, relay means associated with said output circuit and adapted to be released when said oscillatory circuit ceases to oscillate at said fundamental frequency, and means controlled by said relay means and operative during the time said relay means is released for automatically operating and releasing said starting means.

In testimony whereof, I have signed my name to this specification this 29th day of September, 1928.

RALPH K. BONELL.